Dec. 18, 1934.    C. E. CARLSON    1,984,630
VISIBLE FLOW INDICATOR
Filed Feb. 18, 1931    2 Sheets-Sheet 1

Inventor:
Carl E. Carlson
By:- Cheever, Cox & Moore
Attys

Dec. 18, 1934. C. E. CARLSON 1,984,630
VISIBLE FLOW INDICATOR
Filed Feb. 18, 1931 2 Sheets-Sheet 2

Inventor:
Carl E. Carlson
By:- Cheever, Cox & Moore
Attys

Patented Dec. 18, 1934

1,984,630

UNITED STATES PATENT OFFICE 1,984,630

VISIBLE FLOW INDICATOR

Carl E. Carlson, Fort Wayne, Ind., assignor to S. F. Bowser & Company, Fort Wayne, Ind., a corporation of Indiana Application February 18, 1931, Serial No. 516,679

35 Claims. (Cl. 116—117)

This invention relates to indicating devices and more particularly to visible indicators for use with liquid dispensing apparatus for indicating the flow of liquid therethrough.

One of the objects of my invention is to provide a visible indicating device for showing the flow of liquid through a portion of a dispensing apparatus and wherein the movable indicator is not only responsive to small movements of the fluid flow but is also actuated in a positive manner.

Another object of my invention resides in providing a sight glass arranged so that the flow of incoming liquid and the flow of the outgoing liquid provides means for automatically removing air from the top of the sight glass without the need of any relief aperture at the top of the sight glass.

Another object of my invention resides in providing a sight glass of the above character, wherein the inflowing liquid is introduced into the sight glass with a swirling motion, whereas to create a whirlpool effect at the center of the sight glass, which, in co-operation with the discharge outlet of the sight glass operates to suck the air from the top of the sight glass without the need of a relief aperture at the top of the sight glass.

Another object of my invention resides in providing an improved method for the discharge of air from the tops of sight glasses.

Another object of my invention resides in providing a device of the above character, so arranged that the flow of fluid into the visible container in which the indicator is located tends to keep the inner walls thereof clean.

Another object of my invention is the provision of a device of the above character in which one of the supports or caps for the fluid containing bowl is provided with a liquid inlet arranged to create a spiral or circular flow within the bowl.

Another object of my invention resides in the provision of a centrally or axially disposed exit through which the trapped air may be exhausted from the bottom of the bowl.

Another object of my invention resides in providing a bottom cap or casting of particular construction which is peculiarly adaptable for the provision of fluid inlet and exhaust port and which at the same time forms a special support for the spinner indicator, and an ancillary object is to provide a trapped air relief cooperating or associated with the spinner indicator.

Another object of my invention resides in a device of the above character wherein the support for the spinner indicator likewise forms a means for the escape of any air which becomes trapped in the indicating bowl.

Another object of my invention resides in the provision of an air outlet disposed at the top of the bowl and which air outlet is arranged in connection with the spinner indicator so that the trapped air may exhaust at the bottom of the bowl together with the exhaust groove, thereby eliminating the necessity of a separate air vent at the top of the bowl.

Still another object of my invention resides in the provision of a rotatable support for the spinner indicator which is supported solely from one end of the bowl, thereby facilitating manufacture and assembly.

Still another object of my invention resides in a simple and economical construction of the spinner indicator and for the means for rotating and mounting it for rotation on its axis, and an ancillary object of this aspect of my invention resides in the provision of a sheet metal spinner indicator of simple construction and manufacture.

This and other objects of my invention will be apparent from a perusal of the following specification when taken in connection with the accompanying drawings, wherein.

Figure 1:
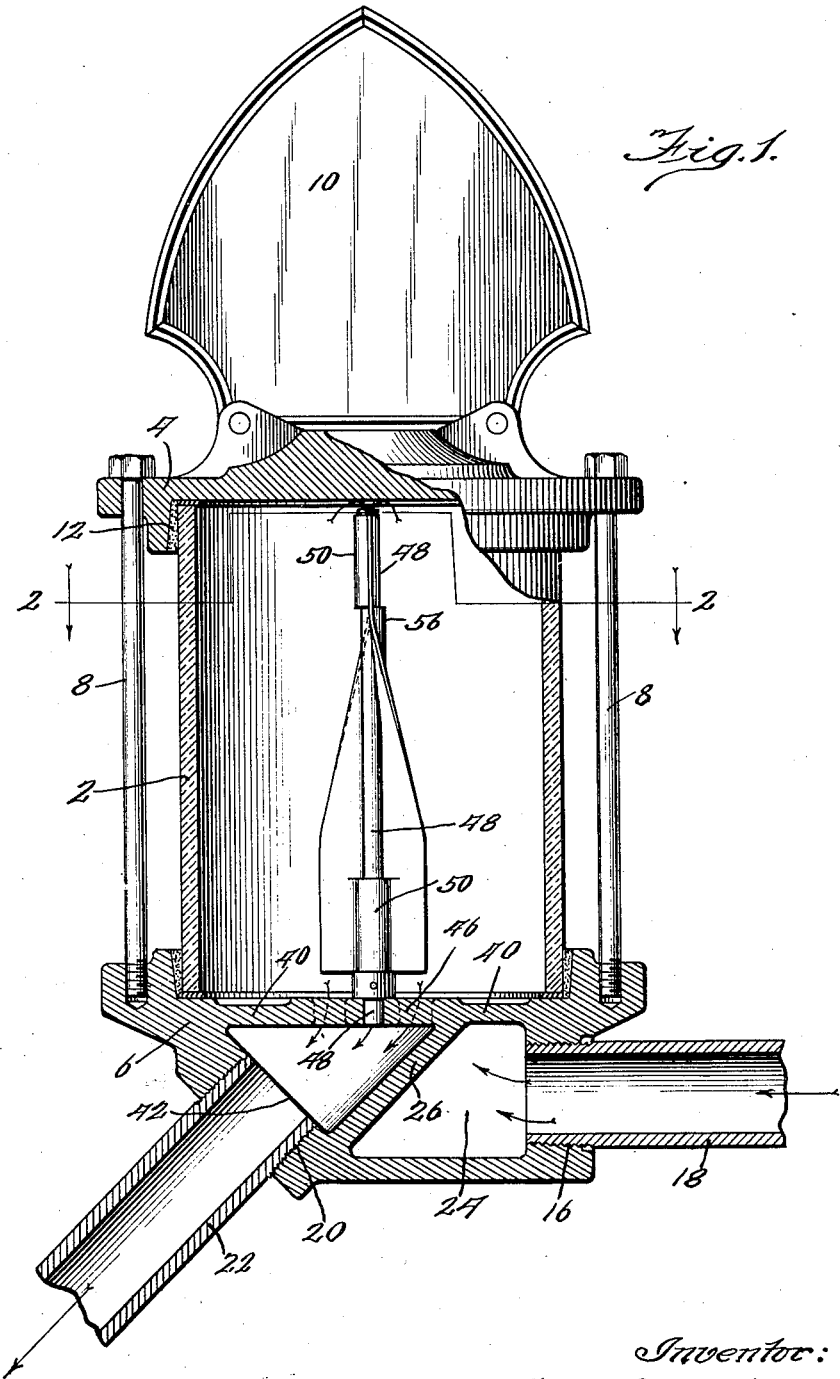
Fig. 1 is a partly sectional view through my improved visible flow indicator.

My invention is particularly suitable for liquid flow systems wherein some indication is desirable that the liquid therein is flowing at particular times. In particular my invention is illustrated in connection with gasoline dispensing apparatus of the type in which a sight bowl is normally maintained full of gasoline. As is well known in the art, certain types of liquid dispensing apparatus are provided with a sight bowl discharge line through which the dispensing liquid, in the present instance gasoline, is adapted to flow, and it is desirable in connection with these sight bowls to provide means adapted to be moved by the flow of gasoline therethrough to indicate when the gasoline is flowing.

While the so-called sight bowl may take any appropriate form, including even a tubular conduit having a sight window therein, I prefer the form illustrated herein in which it comprises a cylinder 2 of transparent material such as glass, clamped between upper and lower caps 4 and 6 respectively, by means of a series of circumferentially disposed spaced-apart rods 8. The upper cap 4 of the sight bowl may be provided with any type of ornamental cap such as the design 10 shown in the drawings, and suitable packings 12 and 14 are disposed at the junction of the glass cylinder 2 and the caps to prevent any possible leakage at the joints.

The bottom cap 6 is preferably formed as a casting. It is provided with an inlet 16 in which is threaded an inlet pipe 18 and is likewise provided with an exit 20 in which is threaded the outlet pipe 22. This base casing or cap is cast with separated internal passages for ingress and egress of the liquid from the sight bowl. The inlet opening 16 communicates with an inlet passage 24, which extends almost concentrically around an inner wall 26. This wall 26 at the side of the base adjacent the exit pipe 22 is sold with the base, as shown by the dotted lines 28, (see Fig. 2). This inner wall 26, beginning from the point 30 and following the dotted line indicated at 28 in Fig. 2 circumferentially around the central portion of the base to the point 32, is spaced from the outer wall 34 of the casing to provide this liquid inlet chamber 24 heretofore mentioned. Chamber 24 at one side of the central axis of the casting is open at its top as indicated at 36, and the bottom wall of the chamber at this point, as indicated at 38, slopes upwardly and the side walls thereof curve in a somewhat spiral manner. The top of the chamber 24 is closed by means of an integrally formed plate 40 at all points of the chamber 24 except at the opening 36, and this opening is shaped so that as the fluid flows in through the inlet pipe 18 into this chamber 24 it will be deflected laterally in a circular manner and into a path concentric with the axis of the base and will thence be deflected up the inclined bottom of the casting at 38 in a more or less spiral formation. To assist in this spiral flow the opening 36 and walls of the passage 24 gradually taper to the point as shown at 32 in Fig. 2, which is adjacent the inner vertical wall of the glass cylinder 2. In this manner the incoming gasoline or liquid is given a spiral or swirling effect as it enters the bowl so that the liquid tends to flow around the inner face of the vertical walls of the sight bowl 2. The wall 26 adjacent the central portion of the casting is formed substantially cup-like except that it is provided with an opening 42 at or near its bottom which connects with the exit 20 and discharge pipe 22. The central portion of the top 40 of this casting is provided with one or more discharge outlets 44 and with an intervening bridge or spider 46, which spider also provides a bearing for the spinner support hereinafter described. Liquid flowing out of the bowl 2 will pass downwardly through the central outlets 44 into the cup-shaped space or well therebelow and thence out through the discharge pipe 22. It will thus be seen that the liquid entering the sight glass with the swirling effect creates a substantially whirlpool or central vortex of outflowing liquid, as a result of which the air at the top of the sight glass is withdrawn by the suction effect and passes outwardly together with the outflowing liquid through the central orifice 44 and thence out through the discharge pipe 42. The discharge of this air is automatically and continuously maintained by the suction effect of the outgoing liquid, and independent of any other means for relieving the air therefrom, and independent of the air relief tube 48 hereinafter described. In other words, the air relief tube 48 is an alternative air relief, but may be used in conjunction with the first mentioned construction of air relief if desired.

The sight bowl is provided with an operatively associated movable spinner intended to be actuated by the flow of fluid in the bowl for indicating this flow. To this end the spider 46 is provided with a central opening into which is disposed a vertically upstanding support, preferably the tube 48. This tube or support is rigidly mounted in this central opening so that the tube is supported solely at one end. Tube 48 is of a length so that it projects almost to the top of the bowl and in fact terminates just short of the upper cap 4 at the central portion of the bowl. By forming the tube hollow its upper end forms an auxiliary and/or alternative air relief or discharge and as indicated in Fig. 1, any air which is trapped in the bowl will flow downwardly through the tube and through the central opening in the spider 46 into the central discharge chamber and out the discharge pipe 22 with the discharging gasoline.

Figures 2, 3, 4:
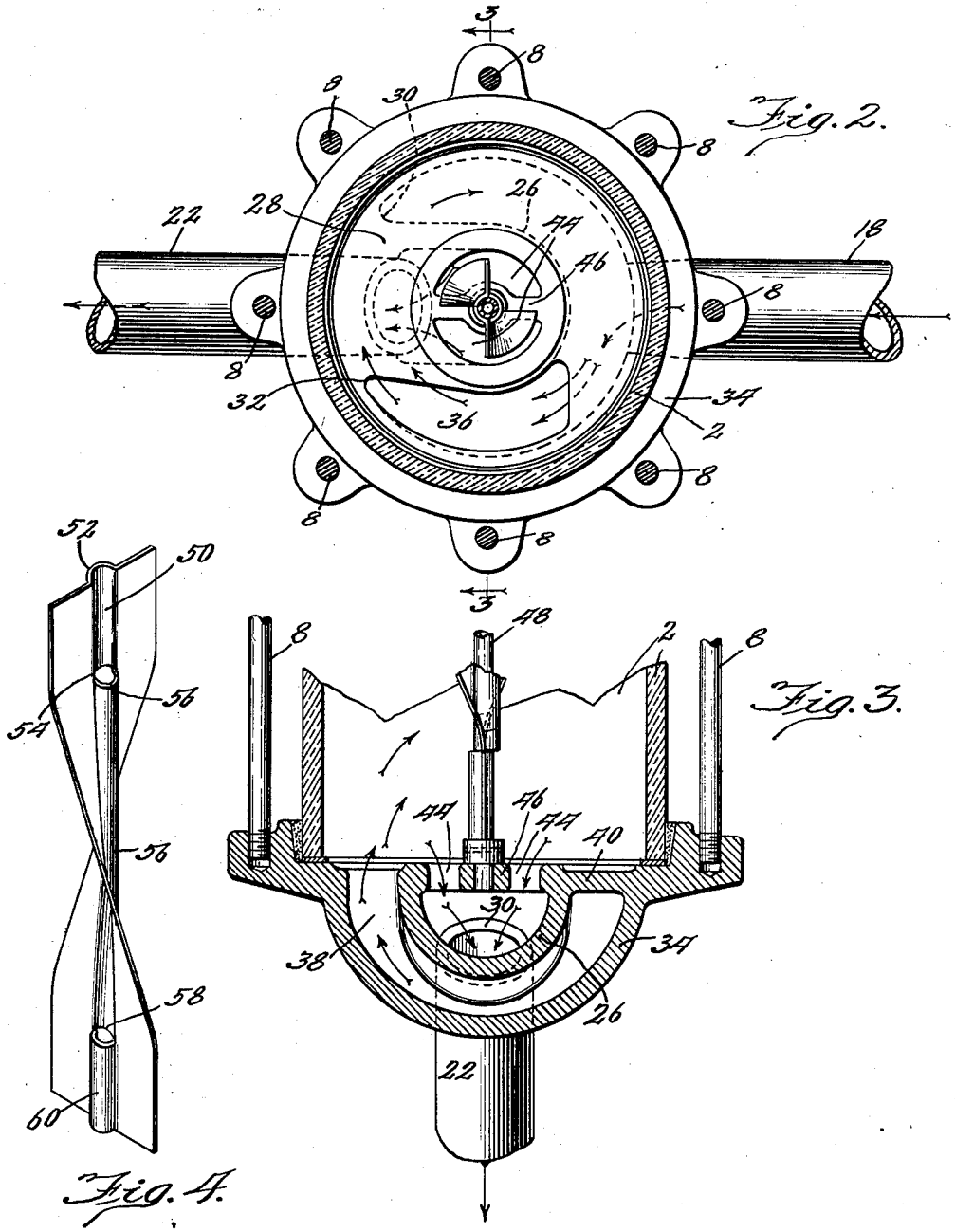
Fig. 2 is a section on line 2—2 of Fig. 1.
Fig. 3 is a section on line 3—3 of Fig. 2.
Fig. 4 is a perspective view of the sheet metal spinner.

The movable indicator or spinner is of simple and economical construction. I preferably form it of a single piece of sheet metal constructed preferably as shown in Fig. 4, wherein the sheet metal is formed from a relatively long, thin rectangular strip suitably shaped to be provided at its top with a longitudinally extending semicircular groove 50 as shown at 52. This groove extends downwardly to a point 54, where the sheet metal is slotted and the sheet metal from this point 54 downwardly is then pressed out as at 56 in a reversely disposed semicircular groove. This grooved portion 56 extends the length of the metal portion of the sheet metal and longitudinally thereof to the point where the metal is again slotted, and at this point the remaining portion centrally and longitudinally of the strip is pressed outwardly as at 60 to form a semicircular groove disposed reversely to the ground portion 56. All of the grooves 50, 54 and 56 are in registration to receive therethrough the tube 48. The spinner is preferably of the spiral type and has a 90° twist preferably intermediate its ends. In the construction illustrated the two extreme ends of the spinner are flat and not twisted in order to provide the half bearing supports 52 and 60. The spinner slides freely over the stationary support 48, and by reason of the bearings 52, 56 and 60 forms a spinner which will rotate freely on the stationary upright support 48. It is preferable to make the spinner of some shiny or polished metal such as cheap aluminum provided with a bright finish, so as to be clearly visible as it rotates in the bearing. Obviously any type of spinner which will rotate upon a central bearing is within the contemplation of my invention, but the spinner shown is of the preferred form.

Although I have mentioned gasoline as being the liquid dispensed, the apparatus is usable with various types of fluid and is usable in connection with an apparatus where the indicator for the flow of fluid is of importance.

It must be clear from an understanding of my invention that due to the liquid flow through the spirally formed inner passage 24 and particularly through the spirally formed outlet at the top 40 of the casting, the gasoline or other liquid as it enters the bowl will be thrown circularly about the inner wall of the bowl rising upwardly and swirling thereabout. In this swirling motion it contacts the spiral blades of the spinner and rotates the same in a very positive manner, and the minimum flow in the bowl will thus cause positive movement of the indicator. At the same time it will be apparent that by utilizing the vertical support 48 not only as a rotatable bearing for the spinner but also by providing the same with an opening at the top and with an internal passage having a connection to the gasoline discharge pipe 42 at the bottom, I am enabled to eliminate a separate air vent in the bowl, particularly at the top of the bowl. In my construction air can pass from the top of the bowl down centrally through the tube 48 without contacting with the liquid in the bowl 2 and can be discharged with the outflowing fluid. Also, as hereinbefore described, if the tube 48 is not used the air will be sucked out of the top of the sight glass by means of a whirlpool effect created by the liquid flowing through the liquid inlet 38 and through the liquid outlets 44.

It will also be apparent that I have provided a simple and economical type of spinner of sheet material construction, and that by forming the base in the manner described I have provided a most effective and positively operating type of spiral inflow and have combined it with a fluid outlet with an axial air outlet of simple and compact construction.

Having thus described my invention, what I claim as new and desire to secure by Letters Patent is:

1. In a liquid flow indicator, the combination of a sight bowl having a cylindrical wall and means for introducing a liquid into said bowl in a manner so as to cause the liquid to flow substantially circumferentially and in contact with said wall whereby to keep said sight glass substantially clean.

2. In a flow-indicating device, the combination with a sight bowl having a closed air-tight top, of means for passing liquid through said bowl so as to cause the liquid to create a whirlpool effect therein, and means located at the vortex of said whirlpool effect for withdrawing air from the top of said bowl and passing it axially of said bowl and discharging it at the bottom of said bowl.

3. In a liquid dispensing apparatus, the combination of a sight bowl, means for passing liquid therethrough, and indicating means adapted to be moved by the flow of liquid passing through said bowl, said indicating means including means for withdrawing air trapped at the top of said bowl.

4. In a liquid dispensing apparatus, the combination of a sight bowl, means for passing liquid through said bowl, a spinner indicator and means forming a portion of said indicator providing an air trap relief for said bowl.

5. In a liquid dispensing apparatus, the combination of a sight bowl having a base casting formed with a centrally disposed outlet passage, said passage communicating with an outlet pipe at one end and communicating with a substantially axially disposed air outlet in said base, said base being also provided with an internal inlet passage disposed substantially concentrically about said outlet passage and connected to a liquid inlet pipe, a portion of said inlet passage having walls inclining upwardly toward the bowl and curving toward the inner circumferential wall of the bowl whereby to give the entering liquid a swirling motion.

6. In a liquid dispensing apparatus, the combination with a sight bowl including a base cap having a central chamber terminating in a liquid outlet, said central chamber having an open top provided with a bridge, said bridge having a perforation disposed axially of the bowl, said bottom cap having an internal liquid inlet chamber disposed substantially concentrically about the centrally disposed liquid exit and connected to a liquid inlet, the said concentric inlet chamber having a portion of its top wall forming a closed bottom plate for the base of the cap and likewise providing a tapered curved liquid inlet for the bowl axially arranged to give the entering liquid a spiral or swirling flow, and a tube mounted in the perforation of the bridge of said base plate, the upper end of the tube terminating short of the top cap of the bowl and open for the removal of trapped air.

7. In a liquid dispensing apparatus, the combination with a sight bowl including a base cap having a central chamber terminating in a liquid outlet, said central chamber having an open top provided with a bridge, said bridge forming a bearing disposed axially in the bowl, said base cap having an internal liquid inlet disposed substantially concentrically about the centrally disposed liquid exit and connected to a liquid inlet, said concentric inlet chamber having a portion of its top walls forming a closed bottom plate for the base of the cap and likewise having a portion of its walls providing a tapered curved liquid inlet for the bowl arranged to give the entering liquid a spiral or swirling flow, a tube mounted on the bridge of said base plate, the upper end of the tube terminating short of the top cap of the bowl and open for the removal of trapped air, and a spinner revolubly mounted on said tube.

8. A sheet metal spinner for a liquid dispensing device comprising a single strip of sheet material, said strip having a spiral twist between its ends and said strip being grooved longitudinally, certain of said grooves extending in an opposite direction and providing oppositely disposed bearings.

9. A spinner for a liquid dispensing apparatus comprising a relatively long, narrow strip having its end portions flat and provided with longitudinally extending substantially semicircular grooves, arranged in longitudinal registration, certain of said grooves being reversely disposed, said strip having a spiral twist.

10. A spinner for a liquid dispensing device comprising a relatively long, narrow strip formed with a plurality of longitudinally extending semicircular grooves disposed in alignment, certain of said grooves longitudinally of said strip being disposed reversely, said strip being formed with propelling vanes.

11. A liquid dispensing apparatus comprising a sight bowl provided with a centrally disposed upstanding rod having upper and lower portions of circular cross-section, and a spinner consisting of a relatively long and narrow strip provided with a longitudinally and axially extending groove, certain portions of said groove above and below the longitudinal center of said strip being reversely arranged, said strip having a longitudinally extending spiral twist, said grooved portions of said strip constituting means whereby said spinner is firmly mounted on said rod.

12. In a flow-indicating device, the combination of a casing having a visible portion through which fluid is adapted to flow, a fluid inlet for said casing comprising a portion extending circumferentially about the inner wall of said casing and terminating in an upwardly inclined portion, said latter portion being adapted to deflect the flow laterally toward the inner circumferential wall of the casing whereby to give the inflowing liquid a substantially spiral motion about the inside wall of the casing for causing the liquid to flow through the casing with a swirling motion, said casing having a liquid outlet disposed at the same end of the casing as the liquid inlet.

13. In a flow-indicating device, the combination with a sight bowl adapted to contain a quantity of liquid, and a liquid inlet for said conduit having means for introducing the entering liquid into the bowl with a swirling motion about the inner circumference of the bowl, and a liquid outlet associated with said inlet for removing the liquid from said bowl and for automatically removing the air from said bowl.

14. In a liquid dispensing apparatus, the combination of a sight glass having a closed, airtight top and having a circumferentially disposed liquid inlet and a substantially centrally disposed liquid discharge, both said inlet and said outlet being located at the bottom of said bowl, said inlet and said outlet including parts arranged to cause the automatic elimination of air from the top of the globe during the passage of liquid from the inlet through the globe and through the outlet.

15. In a device of the class described, a receptacle in part of transparent material and having a wall substantially annular in cross sectional form and closed at both ends, one end having a substantially central outlet, the axis of which substantially parallels that of said annular wall, and means for introducing liquid through such end and directing it into the receptacle in a path such that the liquid tends to discharge through said outlet in whirlpool fashion, thereby creating a suction effect to draw from the receptacle any and all air that may be present therein.

16. In a device of the class described, a receptacle in part of transparent material and having a wall substantially annular in cross sectional form and closed at both ends, one end having a substantially central outlet the axis of which substantially parallels that of said annular wall, and means for introducing liquid through such end in a stream which advances toward the other end and at the same time whirls around said wall, said whirling advancing stream forcing air if present in said receptacle toward the axis of the latter, said last named end turning said stream toward the first named end and causing it to flow inside the advancing part to and through said outlet forming a whirlpool which sucks all air from the receptacle.

17. In a device of the class described, a receptacle in part of transparent material and having a wall substantially annular in cross sectional form and closed at both ends, one end having a wall substantially annular in cross sectional form and closed at both ends, one end having a substantially central outlet, the axis of which substantially parallels that of said annular wall, and means for introducing liquid through such end, and causing it to whirl around the curved surface of such wall and at the same time to advance along the same to the other end in an outside path adjacent said wall, said last named end serving to turn the whirling liquid and direct it in an inside path toward the first named end and to and through said outlet, whereby the liquid is discharged through said outlet in a vortex.

18. In a device of the class described, a receptacle in part of transparent material, said receptacle having a wall of substantially annular cross section closed at its upper end and a base wall on which the first wall is supported in upstanding relation and by which its lower end is closed, said base wall having an outlet substantially in axial alignment with the first wall, and means for introducing liquid into the receptacle through the base wall and for directing the liquid in a path such that it tends to discharge in whirlpool fashion through said outlet.

19. In a device of the class described, a receptacle in part of transparent material, said receptacle having a wall of substantially annular cross section closed at its upper end and a base wall on which the first wall is supported in upstanding relation and by which its lower end is closed, said base wall having an outlet substantially in axial alignment with the first wall, and means for introducing liquid into the receptacle through the base wall and for directing the liquid in a path such that it whirls around the first named wall in an upwardly advancing stream, said upper end turning the whirling stream downwardly in a path inside the ascending stream toward said outlet, whereby the liquid discharges vortex fashion through the outlet and any air in the receptacle is drawn out through the outlet by the suction effect of the vortex.

20. A device of the class described, comprising a base, a hollow member of substantially annular cross section and at least in part of transparent material, said member closed at one end and at its other end mounted upon said base, said base having inlet and outlet passages therein in communication with the space within said member, said outlet passage located substantially in axial alignment with said member, said inlet passage sloping upwardly on an incline in the direction of liquid flow and opening into said space at a point closely adjacent said wall and near the lower end thereof.

21. A device of the class described, comprising a base, a hollow member of substantially annular cross section and at least in part of transparent material, said member closed at one end and at its other end mounted upon said base, said base having inlet and outlet passages therein in communication with the space within said member, said outlet passage located substantially in axial alignment with said member, said inlet passage curving partly around the outlet passage and extending upwardly in the direction of liquid flow in substantially the form of a portion of a helix and opening into the lower end of the hollow member at a point closely adjacent the inner peripheral surface thereof.

22. In a device of the class described, a receptacle in part of transparent material and having a wall of substantially annular cross section closed at one end, a member connected to the other end of said wall and having inlet and outlet passages therein communicating with the space within said wall, said receptacle except for said passages being entirely closed, said inlet passage opening into said space at a point closely adjacent the rounded surface of said wall and constructed to cause the entering liquid to whirl around said wall, and a spinner rotatably supported within the receptacle and having parts located in the path of the entering whirling liquid.

23. In a device of the class described, the combination of a sight glass interposed between the meter and the flexible hose of a dispensing system, means forming a liquid inlet for said glass, means forming a liquid outlet for said glass, and means associated with said inlet and said outlet and constructed and arranged with respect thereto for causing the liquid to travel through said glass so that the flow of liquid into, through and out of said sight glass automatically acts continuously to suck the air from the top of said glass out through the outlet of said glass.

24. A flow indicator comprising an inlet conduit, an outlet conduit, a substantially vertical sealed transparent chamber extending from said inlet and outlet conduits, a hollow indicator shaft extending through said chamber, an indicator on said shaft, the lower end of said hollow indicator shaft extending into the outlet conduit, and means to admit fluid to the upper end of said hollow indicator shaft.

25. A flow indicator comprising a substantially vertical transparent chamber, conduit means for a flow of liquid into and out of said chamber, a tubular member comprising a hollow indicator shaft extending through said chamber and having one end of said shaft located within the line of flow of liquid through said conduit means to cause an aspirating action effective on said shaft to withdraw fluid from the upper portion of said chamber.

26. A flow indicator comprising a substantially vertical transparent chamber, indicator means in said transparent chamber, rotor means to rotate said indicator, conduit means to lead liquid into and out of said chamber, and tubular means connected with the upper end of said chamber and leading into said conduit means to withdraw entrapped air from said chamber.

27. A flow indicator comprising in combination a substantially vertical transparent sealed chamber, an inlet conduit, an outlet conduit located centrally relatively to the axis of said chamber, a hollow shaft extending into the upper portion of said chamber and with the lower end of said hollow shaft extending into said outlet conduit whereby the flow of liquid past the lower end of said shaft causes an aspirating action relative to said hollow shaft to draw entrapped air from said chamber, an indicator adapted to be rotated on the axis of said shaft, and means to rotate said indicator.

28. A flow indicator comprising a cylinder having a transparent portion and provided with an inlet conduit, said cylinder at one end having two spaced-apart substantially centrally disposed outlets, one of said outlets communicating directly with the bottom portion of said cylinder whereby liquid passing through said cylinder may discharge through said outlet, and a tube disposed in said cylinder, one end of said tube discharging into the other outlet, and the other end of said tube having an opening disposed adjacent the upper portion of said cylinder whereby to permit fluid to be drawn with an aspirating action through said tube by the flow of fluid through said first-mentioned outlet and past said second-mentioned outlet.

29. An indicator for liquid dispensing devices comprising a cylinder having a transparent portion and a closed end, said cylinder being provided with an opposite end, the major portion of which is imperforate, said opposite end being provided with substantially centrally located openings separated by a bridge, means for introducing liquid into said cylinder, said opposite end having a fluid outlet below and connecting with said centrally disposed openings, and a tube mounted in an opening in said bridge, the lower end of said tube being open and adapted to discharge in said outlet below said bottom, said tube extending upwardly and provided with an opening in its upper portion.

30. An indicator for liquid dispensing devices comprising a cylinder having a transparent portion and a closed end, said cylinder being provided with an opposite end, the major portion of which is imperforate, said opposite end being provided with substantially centrally located openings separated by a bridge, means for introducing liquid into said cylinder, said opposite end having a fluid outlet below and connecting with said centrally disposed openings, a tube mounted in an opening in said bridge, the lower end of said tube being open and adapted to discharge in said outlet below said bottom, said tube extending upwardly and provided with an opening in its upper portion, and an indicator mounted on said tube, said indicator being turnable to indicate the flow of liquid through said cylinder.

31. A flow indicator comprising a cylinder having a transparent portion, an inlet conduit, an outlet conduit disposed substantially axially of said cylinder at one end thereof and communicating therewith whereby liquid may pass from said inlet conduit into said cylinder and from said cylinder directly through said outlet conduit, a hollow member extending into said chamber with one end open and discharging into said outlet conduit, said hollow member having an opening adapted to admit fluid thereinto from the other end of said cylinder and to pass through said member and thence through said outlet conduit.

32. In a sight glass for a liquid dispensing system, the combination of means forming a cylinder having a transparent portion, a top for said cylinder, and a bottom for said cylinder, said bottom having an inlet channel and having an axially located outlet channel, said inlet channel having a portion eccentric to the outlet channel, and a tube in said cylinder discharging into the outlet channel and having an opening to the upper portion of the cylinder.

33. A flow indicator comprising means forming a chamber, having a transparent portion, said chamber including a top and a bottom, said bottom being formed with a centrally disposed outlet chamber adapted to communicate with a discharge pipe, said bottom being formed with an inlet chamber substantially surrounding said outlet chamber and unconnected therewith, said inlet chamber being adapted for connection with an inlet pipe, and said inlet chamber opening into said cylinder, and a tube mounted on said base and having its lower end communicating with said centrally disposed outlet chamber, said tube extending upwardly in said chamber and having its upper end open adjacent the top of said chamber whereby to admit fluid from said chamber to the upper end of said tube and to permit said fluid to pass downwardly through said tube to be discharged through said centrally located outlet.

34. In a flow indicating device for liquid dispensing systems, the combination of a sight glass adapted to be disposed in the dispensing line and adapted to contain a quantity of liquid, means forming a liquid inlet for said glass including means for causing the liquid passing through said sight-glass to flow therethrough with a substantially whirlpool effect, and means forming a liquid outlet for said glass associated and located with respect to the vortex of said whirlpool of liquid so as to cause air at the top of the sight-glass to be withdrawn by suction effect of said whirlpool and to pass outwardly with the liquid discharging through said outlet.

35. In a device of the class described, the combination of a sight-glass adapted to be inserted in the dispensing line of a liquid dispensing system, means for discharging liquid into the sight-glass to cause the liquid to flow in a substantially spirally travelling upwardly ascending stream following substantially circumferentially the inside wall of the glass and then flowing downwardly in a substantially whirlpool path, and means forming a liquid outlet for said glass associated with the vortex of said whirlpool whereby the liquid discharging from said outlet withdraws air tending to accumulate at the top of said sight-glass.

CARL E. CARLSON.